No. 12,163.

REISSUED OCT. 20, 1903.

F. C. W. STELTER.

CALENDAR.

APPLICATION FILED SEPT. 25, 1903.

2 SHEETS—SHEET 1.

Witnesses

J. G. Hinkel

J. J. McCarthy.

Inventor

F. C. W. Stelter

By Foster Freeman & Watson

Attorneys

No. 12,163. REISSUED OCT. 20, 1903.

F. C. W. STELTER.

CALENDAR.

APPLICATION FILED SEPT. 25, 1903.

2 SHEETS—SHEET 2.

Witnesses

J. G. Stinkel

J. J. McCarthy.

Inventor

F. C. W. Stelter

By

Baker Hawes & Baker

Attorneys

No. 12,163. Reissued October 20, 1903.

UNITED STATES PATENT OFFICE.

FRANCIS C. W. STELTER, OF LONG ISLAND CITY, NEW YORK.

CALENDAR.

SPECIFICATION forming part of Reissued Letters Patent No. 12,163, dated October 20, 1903.

Original No. 722,924, dated March 17, 1903. Application for reissue filed September 25, 1903. Serial No. 174,679.

*To all whom it may concern:*

Be it known that I, FRANCIS C. W. STELTER, a citizen of the United States, residing at Long Island City, in the county of Queens and State of New York, have invented certain new and useful Improvements in Calendars, of which the following is a specification.

This invention relates to calendars, and particularly to perpetual calendars.

The objects and nature of my invention will be fully disclosed in the following specification, reference being had to the accompanying drawings, in which—

Figure 4:
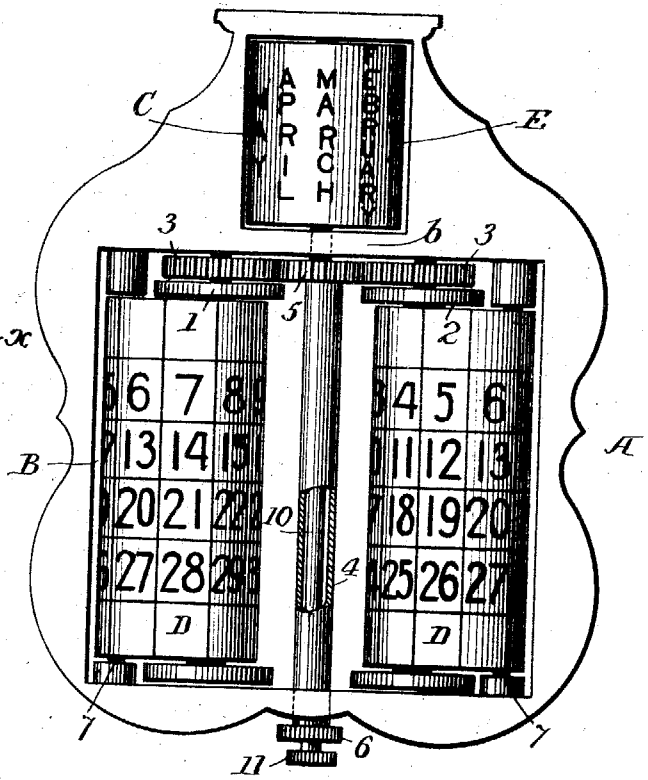
Figure 1:
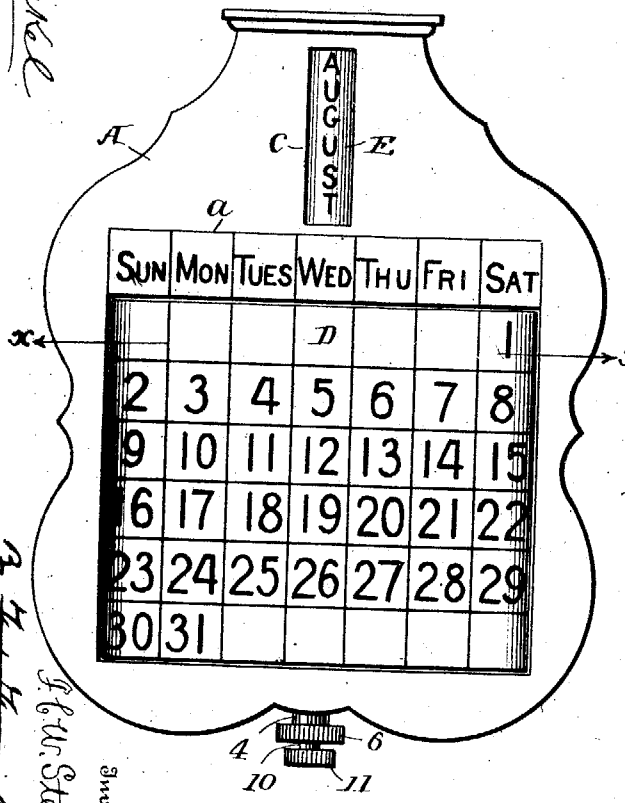
Figure 2:
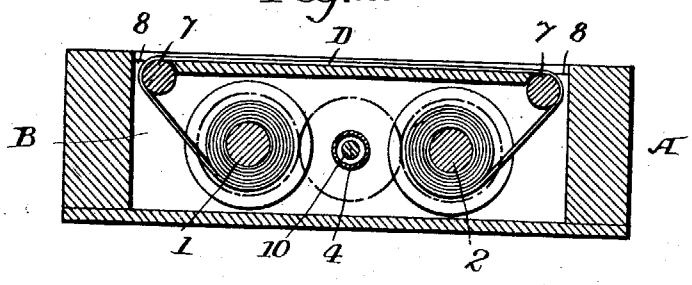
Figure 3:
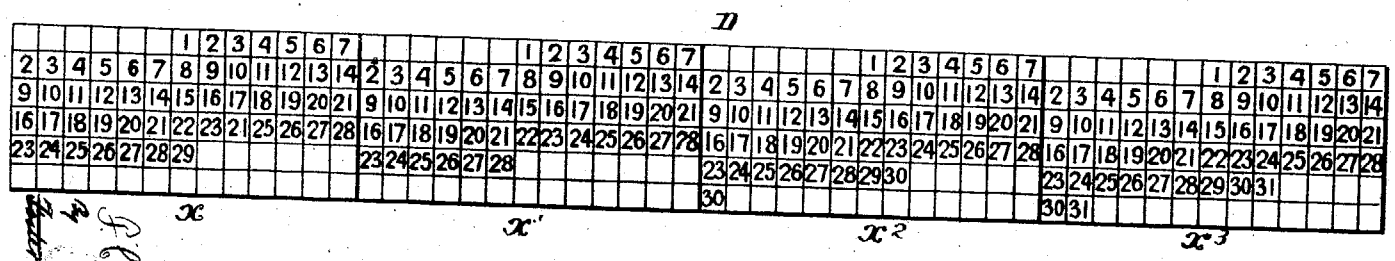

Figure 1 is a front elevation of a calendar embodying my invention. Fig. 2 is a horizontal section on the line $x\,x$ of Fig. 1. Fig. 3 is a plan view of the strip employed to indicate the days of the month. Fig. 4 is an elevation of the rear side of the calendar, partly in section and with the back plate removed.

Preferably I employ a casing A of any desired dimensions, having formed therein two chambers B and C, preferably rectangular, one chamber, B, being much larger than the other, C, and the latter being above the middle portion of the former, there being a partition (indicated by $b$) between them.

The two ends of the strip D are respectively secured to spools 1 and 2, journaled in bearings in the chamber B and each having a gear-wheel 3 at one end, (preferably the upper end,) as shown. Intermediate the spools 1 and 2 is a tubular shaft 4, supported to turn in the bottom wall of chamber B and the partition $b$, and this shaft carries a gear 5, which meshes with the gears 3. For the purpose of turning the shaft 5 a knob 6, exterior of the casing, is connected to one end of the shaft, preferably its lower end, as shown. The strip D, which will wind onto and off the spools 1 and 2, passes from the spools around guide-rollers 7 7, near the ends of the chamber B, and through slots 8 in the front wall of the casing, so that any desired part of the strip may be exposed on the outer front face of the casing. The space between the slots will be just sufficient to expose any seven of the vertical columns of the strip D.

It is necessary to provide some means for indicating the name of the month in conjunction with the day of the month, and preferably I provide a movable device within the chamber C. Thus within said chamber C a cylinder E is supported on a shaft 10, journaled in the upper wall of the chamber C and the partition $b$, and said shaft 10 extends down through the tubular shaft 4 and beyond the knob 6 and is provided at its outer end with a knob 11, by which the shaft 10 and cylinder E may be turned. On the periphery of the cylinder the names of the twelve months of the year are indicated, and there is a slot $c$ in the front wall of chamber C of a width sufficient to expose to sight the name of a single month. By turning the cylinder E the name of any month may be exposed to view through the slot $c$.

The strip D has, preferably, four divisions $x\,x'\,x^2\,x^3$, each being divided into seventy-eight squares, there being six parallel horizontal rows of thirteen squares each. In the top row of each section the first six squares to the left are vacant and in the other seven the numbers "1" to "7" appear consecutively. In the second row the numbers "2" to "14" appear consecutively. In the third row the numbers "9" to "21" appear consecutively. In the fourth row the numbers "16" to "28" appear consecutively. In division $x$, which is intended to indicate the days of the month of February in leap-years, the numbers "23" to "29" appear consecutively in the fifth row and no numbers appear in the sixth row. In division $x'$, which is intended to indicate the days of the month of February in years other than leap-years, the numbers "23" to "28" appear in the fifth row and no numbers appear in the sixth row. In division $x^2$, which is intended to indicate the days of the months having thirty days, the numbers "23" to "30" appear consecutively in the fifth row, and the number "30" appears in the first square on the left of the sixth row, all the other squares in this row being vacant. In division $x^3$, which is intended to indicate the days of months having thirty-one days, the numbers "23" to "31" appear consecutively in the fifth row, and the numbers "30" and "31" appear in the first two squares on the left of the sixth row, all the other squares in this row being vacant. It will be observed that the numbers "1," "8," "15," "22," and "29," which appear in the middle vertical row of each section, are not duplicated and that all the other numbers in each section are duplicated.

On the front face of the casing A above the strip D there will be seven divisions or spaces *a*, substantially equal in width to the width of the squares on the strip D, and in the respective squares *a* will appear the usual abbreviations "Sun.," "Mon.," &c., indicating the days of the week, and these will be permanent.

As the sections of the strip D intended for use in months having thirty and thirty-one days, respectively, will be used oftener than the two other sections, they will preferably adjoin each other. Also, preferably, the strip for use for February in leap-year will be at one end of the strip.

In use the cylinder E will be turned to expose the name of the current month at the slot *c*, and one of the sections of the strip will be brought into position by turning the tubular shaft 4 until the figure "1," indicating the first day of the month, is under the proper day of the week, and then all the other days of the month will be indicated in proper position, as in an ordinary calendar.

Having described my invention, I claim—

1. In a perpetual calendar, a strip having a plurality of divisions or sections, one of said sections indicating thirty-one days and adapted for use for all months having that number of days, another of such sections indicating thirty days and adapted for use for all months having that number of days, and the remaining sections indicating days for February only, and each section having a series of vertical rows of figures indicating the days of the month, the numbers in the middle vertical row appearing only once, and all the other numbers being duplicated, combined with a support for such strip having on its face marks indicating the days of the week, means for moving the strip across the face of the support adjacent to said marks, and a device carried by said support and having marks on it to indicate the names of the months, and means for moving said device, substantially as set forth.

2. In a perpetual calendar, a strip having a plurality of divisions or sections, one of said sections indicating thirty-one days and adapted for use for all months having that number of days, another of such sections indicating thirty days and adapted for use for all months having that number of days, and the remaining sections indicating days for February only, and each section having a series of vertical rows of figures indicating the days of the month, the numbers in the middle vertical row appearing only once, and all the other numbers being duplicated, combined with a support for such strip having on its face marks indicating the days of the week, means for moving the strip across the face of the support adjacent to said marks, and a cylinder carried by said support and having marks on its periphery to indicate the months, and means for rotating said cylinder, substantially as set forth.

3. In a perpetual calendar, a strip having a plurality of divisions or sections, one of said sections indicating thirty-one days, and adapted for use for all months having that number of days, another of such sections indicating thirty days and adapted for use for all months having that number of days, and the remainder of said strip indicating days for February only, and each section having a series of vertical rows of figures indicating the days of the month, the numbers in the middle vertical row appearing only once, and all the other numbers being duplicated, combined with a support for such strip having on its face marks indicating the days of the week, means for moving the strip across the face of the support adjacent to said marks, and a device carried by said support and having marks on it to indicate the names of the months, and means for moving said device, substantially as set forth.

4. In a perpetual calendar, a strip having a plurality of divisions or sections, less in number than the number of months in a year, one of said sections indicating thirty-one days and adapted for use for all months having that number of days, another of such sections indicating thirty days and adapted for use for all months having that number of days, and the remainder of said strip indicating days for February only, each section having a series of vertical rows of figures indicating the days of the month, the numbers in the middle vertical row appearing only once, and the other rows of numbers being duplicated.

5. In a perpetual calendar, a strip having a plurality of divisions or sections, less in number than the number of months in a year, one of said sections indicating thirty-one days and adapted for use for all months having that number of days, another of such sections indicating thirty days and adapted for use for all months having that number of days, and the remainder of said strip indicating days for February only, each section having a series of vertical rows of figures indicating the days of the month, the numbers in the middle vertical row appearing only once, and the other rows of numbers being duplicated, said strip being movably mounted and combined with a stationary device indicating the days of the week.

In testimony whereof I have signed my name to this specification in the presence of two subscribing witnesses.

FRANCIS C. W. STELTER.

Witnesses:
LENA STELTER,
R. E. MOORE.